United States Patent
Scott et al.

[11] Patent Number: 6,121,880
[45] Date of Patent: Sep. 19, 2000

[54] STICKER TRANSPONDER FOR USE ON GLASS SURFACE

[75] Inventors: Dale Larry Scott, Albuquerque; Peter Scott Hughes, Rio Rancho, both of N. Mex.

[73] Assignee: Intermec IP Corp., Woodland Hills, Calif.

[21] Appl. No.: 09/321,506

[22] Filed: May 27, 1999

[51] Int. Cl.[7] .................................................. G08B 13/157
[52] U.S. Cl. ..................... 340/572.5; 340/572.7; 340/572.8; 340/825.34; 340/825.54
[58] Field of Search .................. 340/572.5, 572.7, 340/825.34, 825.3, 825.54, 572.8

[56] References Cited

U.S. PATENT DOCUMENTS

| | | | |
|---|---|---|---|
| 4,782,345 | 11/1988 | Landt | 343/727 |
| 4,786,907 | 11/1988 | Koelle | 342/51 |
| 4,816,839 | 3/1989 | Landt | 343/795 |
| 5,661,473 | 8/1997 | Paschal | 340/825.54 |
| 5,771,021 | 6/1998 | Veghte et al. | 342/51 |
| 5,995,898 | 11/1999 | Tuttle | 701/102 |

*Primary Examiner*—Glenn Swann
*Attorney, Agent, or Firm*—O'Melveny & Myers LLP

[57] ABSTRACT

A sticker transponder adapted to be affixed to a glass surface, such as a vehicle windshield, includes a RFID transponder enabling the storage and retrieval of vehicle related data. The sticker transponder comprises a flexible circuit substrate having an antenna formed thereon and a transponder circuit disposed on the substrate and coupled to the antenna. An adhesive layer is coupled to a first surface of the flexible circuit substrate. An indicia layer is coupled to a second surface of the flexible circuit opposite from the first surface. The indicia layer comprises a space permitting indicia to be printed thereon. The antenna has a characteristic impedance defined in part by a dielectric constant of the flexible circuit substrate in combination with a dielectric constant of the glass surface. As a result, a proper impedance match between the antenna and the transponder circuit is achieved only when the sticker is affixed to the glass surface. The sticker transponder further comprises a release liner affixed to the adhesive layer, the release liner being selectively removable to permit the sticker transponder to be affixed to the glass surface. The transponder circuit further includes a memory having a read-only portion and a re-writable portion.

16 Claims, 2 Drawing Sheets

STICKER TRANSPONDER FOR USE ON GLASS SURFACE

BACKGROUND OF THE INVENTION

1. Field of the Invention

The present invention relates to radio frequency identification (RFID) systems, and more particularly, to a theft-resistant vehicle windshield sticker containing an RFID transponder permitting vehicle-related data to be readily stored, remotely accessed, and updated.

2. Description of Related Art

Every one of the millions of motor vehicles operating in this country and abroad has associated vehicle-related data that must be made readily accessible to the operator and others. For example, certain state and local governments require certain kinds of vehicle-related data to be displayed on the exterior of the vehicle, such as current vehicle registration, safety inspection, valid handicap status certification, and emission control certification. Law enforcement personnel may additionally require other kinds of vehicle-related data to be maintained within the vehicle, such as proof of ownership and insurance coverage. The vehicle owner/operator and/or other private entities may additionally require still other kinds of vehicle-related data in the course of ordinary use of the vehicle, such as for parking access validation, monitoring and revenue collection. Separate tracking and storage systems exist for each of these different types of vehicle-related data.

The most common form of vehicle-data storage device is a sticker containing alphanumeric data. Vehicle stickers may be imprinted with colorful indicia and/or data, and can be affixed to the exterior of a vehicle in a highly visible manner. Moreover, vehicle stickers cannot be easily removed from a vehicle, making them inherently theft-resistant. A significant drawback with vehicle stickers is that their information capacity is rather limited and cannot be easily updated. As a result, vehicle operators must periodically replace or cover over expired stickers with new stickers. The difficulty of removing expired stickers is also a disadvantage, as many vehicle owners consider the proliferation of vehicle stickers to be an eyesore that mars the beauty of their vehicle. Another common form of vehicle-data storage device is a card encoded with data, such as human-readable data (i.e., alphanumeric characters) or machine-readable data (i.e. optical indicia, such as bar code symbols, or magnetically recorded data). An advantage of an encoded card is that it generally has a much greater data capacity than that of a sticker. Nevertheless, the card is not affixed to the vehicle exterior and must therefore be kept either within the vehicle or on the vehicle operator's person, thereby increasing the risk that the card will be lost or stolen. Another drawback with an encoded card is that it is usually not visible from the exterior of the vehicle to the same degree as a sticker.

In the automatic data identification industry, the use of RFID transponders (also known as RFID tags) has grown in prominence as a way to obtain data regarding an object onto which an RFID transponder is affixed. An RFID transponder generally includes a semiconductor memory in which information may be stored. An RFID interrogator containing a transmitter-receiver unit is used to query an RFID transponder that may be at a distance from the interrogator and moving at highway speeds. The RFID transponder detects the interrogating signal and transmits a response signal containing encoded data back to the interrogator. Such RFID transponders may have a memory capacity of several kilobytes or more, which is substantially greater than the maximum amount of data that may be contained in a bar code symbol or other types of human-readable indicia. Further, the RFID transponder memory may be re-written with new or additional data, which would not be possible with a printed bar code symbol. RFID transponders may also be readable at a distance without requiring a direct line-of-sight view by the interrogator, unlike bar code symbols or other types of human-readable indicia that must be within a direct line-of-sight and which may be rendered entirely unreadable if obscured or damaged.

Notwithstanding these advantages, RFID transponders have not been accepted commercially as a vehicle-related data storage device. One reason for this lack of commercial acceptance stems from the size of the RFID transponder package, which has been driven primarily by the size requirements of the dipole antenna. The RFID transponders necessarily have a larger profile than conventional vehicle stickers, and therefore cannot be unobtrusively affixed to the exterior of a vehicle. While the RFID transponders can be provided in a package that is kept within the vehicle, such packages are susceptible to theft and do not convey visual information to the same degree as a vehicle sticker. A final drawback of RFID systems is the lack of standardization between data formats necessary to permit different types of vehicle-related data to be stored in a single device.

Accordingly, it would be desirable to provide a highly visible and theft-resistant form of vehicle-related data storage device, such as a sticker transponder, that includes the data capacity and re-write capability of an RFID transponder.

SUMMARY OF THE INVENTION

In accordance with the teachings of the present invention, a sticker transponder adapted to be affixed to a glass surface, such as a vehicle windshield, includes an RFID transponder enabling the storage and retrieval of vehicle related data.

More particularly, the sticker transponder comprises a flexible circuit substrate having an antenna formed thereon and a transponder circuit disposed on the substrate and coupled to the antenna. An adhesive layer is coupled to a first surface of the flexible circuit substrate. An indicia layer is coupled to a second surface of the flexible circuit opposite from the first surface. The indicia layer comprises a space permitting indicia to be printed thereon. The antenna has a characteristic impedance defined in part by a dielectric constant of the flexible circuit substrate in combination with a dielectric constant of glass material, such as a vehicle windshield. As a result, a proper impedance match between the antenna and the transponder is achieved only when the sticker is affixed to the glass material. The sticker transponder further comprises a release liner affixed to the adhesive layer, the release liner being selectively removable to permit the sticker transponder to be affixed to the glass material. The transponder circuit further includes a memory having a read-only portion and a re-writable portion.

The sticker transponder may be used to store various types of data, such as data pertaining to a vehicle. For example, the read-only portion of the memory may be preprogrammed with data that cannot be altered, such as a vehicle identification number. Other types of data, such as vehicle registration data, safety certification data, and emission control certification data, may be stored in the re-writable portion of the memory and periodically updated to reflect current compliance status. Similarly, toll collection data may be stored in the memory, and an RFID reader may be provided in a toll collection station. This way, the toll collection data may be decremented each time the vehicle passes the toll collection station.

A more complete understanding of the sticker transponder will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention satisfies the need for a highly visible and theft-resistant form of vehicle-related data storage device, such as a sticker, that includes the data capacity and re-write capability of an RFID transponder. In the detailed description that follows, like element numerals are used to describe like elements illustrated in one or more of the figures.

Figure 1:
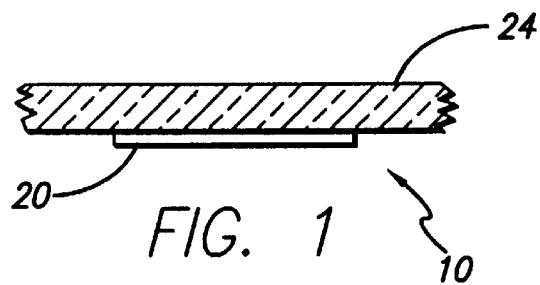
FIG. 1 is a sectional view of a sticker transponder in accordance with the present invention affixed to a vehicle windshield.
Figure 3:
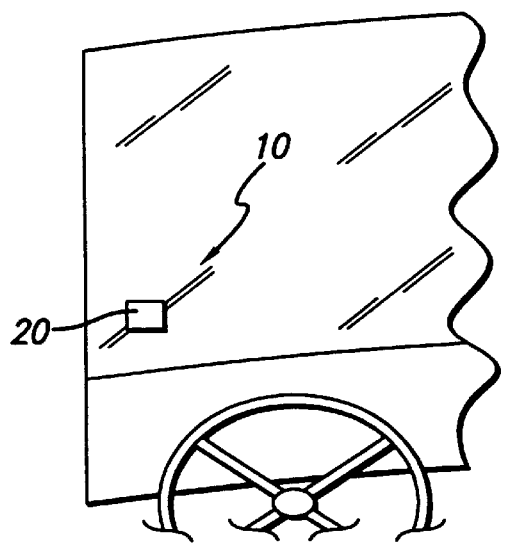
FIG. 3 is a perspective view illustrating the sticker transponder affixed to the vehicle windshield.

Referring first to FIGS. 1 and 3, an exemplary sticker transponder 10 in accordance with the present invention is shown. The sticker transponder 10 comprises a generally rectangular shape having a facing surface 20 adapted to have indicia printed thereon. It should be appreciated that the printed indicia may include both human-readable and machine-readable information, data and characters, and may be printed using colored or black ink as desired. The types of indicia that may be printed on the facing surface 20 include, but are not limited to, state vehicle registration information, safety and/or emission control certification status, parking access authorization, vehicle toll collection, etc. As shown in FIG. 3, the sticker transponder 10 is affixed to an inside surface of a motor vehicle windshield 24 at a lower left-hand corner thereof, but it should be appreciated that the sticker transponder may alternatively be affixed to any generally vertically-oriented glass surface, such as the vehicle side and rear windows. As known in the art, a typical vehicle windshield has a thickness of approximately 0.19 to 0.24 inches.

Figure 2:
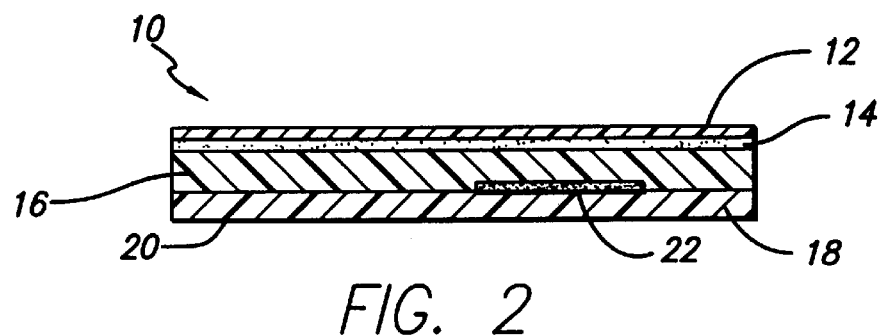
FIG. 2 is an enlarged sectional view of the sticker transponder.

FIG. 2 illustrates the sticker transponder 10 in cross-section in greater detail, and shows a generally laminate construction of the sticker transponder including an adhesive layer 14, a flexible circuit substrate layer 16 and an overlaminate layer 18. The flexible circuit substrate layer 16 is provided at roughly the center of the sticker transponder 10. The flexible circuit substrate 16 is comprised of an electrically insulating material having a suitable dielectric constant, such as fiberglass or plastic, or other commercially available materials sold under the names of Kapton® or Pyralux®. An application specific integrated circuit (ASIC) 22 is electrically connected to the flexible circuit substrate layer 16, such as by surface mounting, as will be further described below. The flexible circuit substrate 16 additionally includes an antenna provided thereon, as will also be further described below. It is anticipated that the flexible circuit substrate layer 16 have a thickness as small as possible, such as less than 1/16 inch, in order to keep small the overall thickness of the sticker transponder 10.

A first surface of the flexible circuit substrate layer 16 has a protective overlaminate layer 18 affixed thereto. The overlaminate layer 18 has an exterior surface 20 that may be selectively printed with indicia, such as machine-readable or human-readable indicia as described above. The overlaminate layer 18 may further comprise a plastic material that is sufficiently rugged to protect the underlying flexible circuit substrate 16, keep out moisture, resist tearing, and generally prevent the printed indicia from becoming obscured. A second surface of the flexible circuit substrate layer 16 opposite from the first surface is provided with a transparent adhesive layer 14, which permits the sticker transponder 10 to be affixed to a glass material surface, such as the vehicle windshield. The adhesive layer 14 would ordinarily be covered by an inert release liner 12 in order to permit handling of the sticker transponder 10 prior to actual use. As known in the art, the release liner 12 may be easily peeled off to expose the adhesive layer 14 prior to affixing the sticker transponder to the glass surface. The release liner may further include pre-printed instructions for informing a user on how to use the sticker transponder 10 and where to affix the sticker transponder on a vehicle windshield.

Figure 4:
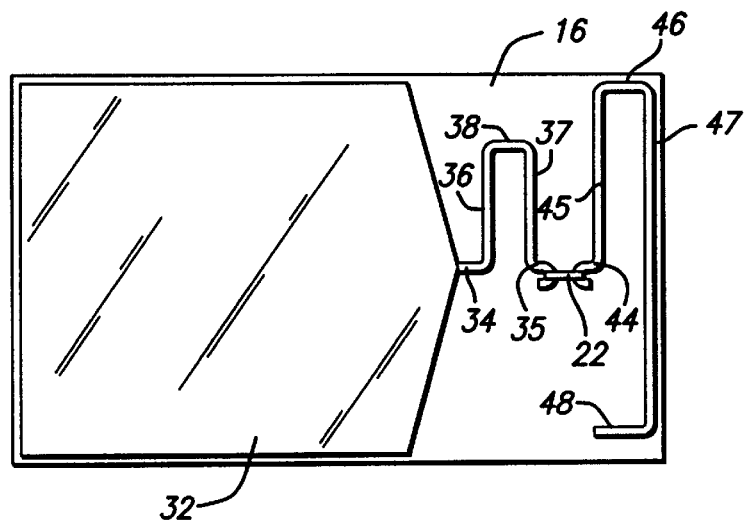
FIG. 4 is a top plan view illustrating a conductive pattern on a flex-circuit within the sticker transponder.

Referring now to FIG. 4, a plan view of a component side surface of the flexible circuit substrate layer 16 is illustrated. A conductive material 32 is disposed on the surface of the flexible circuit substrate layer 16 facing the transparent adhesive layer 14. The conductive material 32 may be formed from a thin sheet of suitable material such as copper that has been selectively etched to leave a desired circuit pattern. Alternative methods, such as depositing or printing a conductive material, may also be utilized to provide the conductive material 32, as generally known in the art. As shown in FIG. 4, the conductive material 32 is provided in a trapezoidal configuration that covers approximately ⅔ of the surface area of the flexible circuit substrate layer 16. A first end portion of the trapezoidal region corresponds to the rectangular shape of the flexible circuit substrate layer 16, and a second end portion culminates in an apex disposed approximately at a median position between opposite side edges of the flexible circuit substrate layer.

The flexible circuit substrate layer 16 further includes the application specific integrated circuit 22 coupled to electrical terminals provided on the flexible circuit substrate layer using conductive material. The application specific integrated circuit 22 may be electrically connected to the flexible circuit substrate layer 16 using known techniques, such as surface mount, wire-bond, flip-chip, or conductive adhesive technologies. First elongated regions 34–38 are electrically coupled between the apex of the trapezoidal region and one of the electrical terminals of the integrated circuit 22, and second elongated regions 44–48 are coupled to a second one of the electrical terminals. The elongated regions 34–38, 44–48 are comprised of conductive material formed in the same manner as the material 32 described above. As will be further described below, these separated elongated regions provide poles of a dipole antenna for the RFID transponder in which length along the lengthwise dimension of the flexible circuit substrate layer 16 (i.e., regions 34, 38, 35, and 44, 46) should be approximately ¼ of a wavelength at the frequency of operation of the antenna. In the preferred embodiment of the invention, the frequency of operation is approximately 915 MHz. In actuality, the combined lengths of the poles of the dipole antenna can be increased somewhat due to the effect of the trapezoidal region. The portions of the elongated regions that extend in the widthwise dimension (i.e., regions 36, 37, and 45, 47) comprise tuning stubs that provide an impedance matching function, as will be further described below. It should be appreciated that the particular arrangement of the poles of the dipole antenna on the flexible circuit substrate layer 16 will determine the polarization of the antenna with respect to receiving and transmitting RF signals. It should also be appreciated that the present invention would not be limited to using a dipole antenna, but that any type of antenna formed on the flexible circuit substrate layer 16 may also be advantageously utilized.

Figure 5:
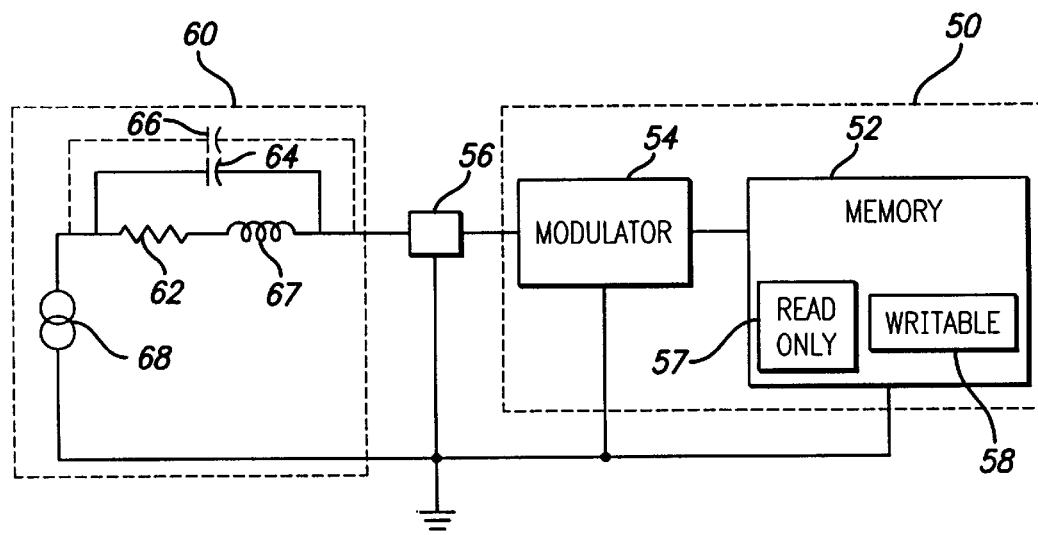
FIG. 5 is a simplified electrical diagram of the sticker transponder including an antenna and transponder circuit assembly.

Referring now to FIG. 5, an exemplary circuit schematic of the sticker transponder 10 is shown. The antenna is represented within the dotted box 60. The antenna 60 generates an alternating voltage from the signal transmitted from an RFID reader (not shown) represented by a generator 68. The impedance of the antenna 60 is represented by a capacitor 64 in parallel with a resistor 62 and an inductor 67. An impedance matching section 56 connects the antenna 60 to a transponder circuit 50, which includes a modulator 54 and a memory 52. As described above, the tuning stubs (i.e., regions 36, 37, and 45, 47) provide the impedance matching section 56. The modulator 54 provides the function of communicating data signals to and from the antenna 60, and the memory 52 provides the function of storing data. The memory 52 may include a writable portion 58 that may be selectively written-to by a remote reader, and may also include a read-only portion 57 that includes data that may not be altered, such as the vehicle identification number (VIN). The transponder circuit 50 may further comprise an RFID transponder, such as disclosed by U.S. Pat. No. 4,786,907, issued Nov. 22, 1998, for "Transponder Useful In A System For Identifying Objects," the subject matter of which is incorporated by reference herein.

The exemplary circuit schematic further includes a capacitor 66 coupled in parallel with the impedance defined by the capacitor 64, resistor 62 and inductor 67. The capacitor 66 is a function of the dielectric constant of the glass material 24 (see FIG. 1) having a thickness within a known range. When the sticker transponder 10 is affixed to the glass 24, the capacitor 66 is in parallel with the capacitor 64, resistor 62 and inductor 67. Conversely, when the sticker transponder 10 is not affixed to the glass, such as prior to use or after removal from the glass, the capacitor 66 is uncoupled from the capacitor 64, resistor 62 and inductor 67. Accordingly, the addition of the capacitor 66 directly affects the impedance of the antenna 60. The impedance matching section 56 is therefore intentionally tuned to match the relatively high impedance of the transponder circuit 50 to the relatively low impedance of the antenna 60 when the sticker transponder 10 is affixed to the glass. Conversely, an improper impedance match is formed when the capacitor 64 is uncoupled from the capacitor 64, resistor 62 and inductor 67. As a result, the antenna 60 is only effective in communicating signals with the transponder circuit 50 when the sticker transponder 10 is affixed to the glass.

Figure 6:
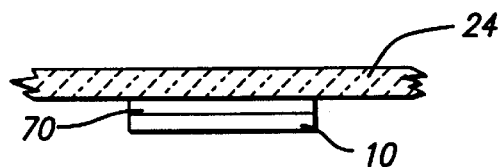
FIG. 6 is a sectional view of an alternative embodiment of the sticker transponder affixed to a metallized vehicle windshield.

FIG. 6 illustrates an alternative embodiment of the present invention. As known in the art, certain windshields are "metallized" in which a small layer of metal (e.g., a few angstrom thickness) is provided between layers of the windshield glass. The metallized windshields are advantageous in that they provide a certain level of thermal insulation by reducing infrared radiation heat transfer. Unfortunately, the metallized windshield would preclude RF communication with an RFID transponder disposed within the vehicle, as in the foregoing embodiment. To overcome this impediment, the sticker transponder 10 of FIG. 6 is affixed to an outside surface of the glass 24, with a spacer layer 70 disposed between the sticker transponder and the glass. The spacer layer 70 may further include an adhesive layer and associated release liner, in order to enable the spacer layer to be affixed to the vehicle windshield 24. The spacer layer 70 is comprised of a material having a thickness and a dielectric constant similar to that of the glass, so that a proper impedance match is formed between the antenna 60 and the transponder circuit 50 when the sticker transponder 10 is affixed to the spacer layer 70.

It should be appreciated that the sticker transponder 10 of the present invention permits a remote RF signal to interrogate the encoded information stored within the memory 52 of the transponder circuit 50. This allows a vehicle to which the sticker transponder 10 is affixed to be remotely identified as it is moving, even at high speeds. As a result, encoded information such as parking fees, toll collection, safety and smog certification and vehicle registration, etc. can be monitored remotely. Further, the encoded information can be updated remotely without having to remove the sticker transponder 10. For example, after the vehicle passes a periodic safety or smog inspection, a portion of the memory 52 could be updated with an identification of the inspection facility and the next expiration date. In another example, the sticker transponder can be used for toll collection wherein a vehicle sticker may be programmed for a certain number of fares or for a certain amount of time. The encoded data may be decremented each time the user passes the vehicle through an entry gate equipped with a suitable reader. It should be further appreciated that the transponder circuit 50 may be provided with sufficient memory to store all various types of encoded information, thereby eliminating the need for a plurality of vehicle stickers for different purposes. Moreover, there is an inherent anti-theft aspect to the sticker transponder 10, in that the sticker transponder is rendered inoperative if it is removed from the vehicle windshield. The material layers of the sticker transponder 10 can be specially formulated to further preclude removal of an affixed sticker without destruction of the sticker, such as by including perforation lines that tear upon removal.

Having thus described a preferred embodiment of an RFID transponder in a vehicle windshield sticker, it should be apparent to those skilled in the art that certain advantages of the herein described system have been achieved. It should also be appreciated that various modifications, adaptations, and alternative embodiments thereof may be made within the scope and spirit of the present invention. The invention is further defined by the following claims.

What is claimed is:

1. A sticker transponder adapted to be affixed to a glass surface, comprising:
   a flexible circuit substrate having an antenna formed thereon and a transponder circuit disposed on the substrate and coupled to said antenna;
   wherein, said antenna has a characteristic impedance defined in part by a dielectric constant of said flexible circuit substrate in combination with a dielectric constant of said glass surface, such that a proper impedance match between said antenna and said transponder circuit is achieved only when said sticker transponder is affixed to said glass surface.

2. The sticker transponder of claim 1, further comprising an adhesive layer coupled to a first surface of said flexible circuit substrate.

3. The sticker transponder of claim 2, further comprising a release liner affixed to said adhesive layer, said release liner being selectively removable to permit said sticker to be affixed to said vehicle windshield.

4. The sticker transponder of claim 2, further comprising an indicia layer coupled to a second surface of said flexible circuit substrate opposite from said first surface, said indicia layer comprising a space permitting indicia to be printed thereon.

5. The sticker transponder of claim 1, wherein said glass surface further comprises a vehicle windshield.

6. The sticker transponder of claim 1, wherein said antenna further comprises a dipole antenna.

7. The sticker transponder of claim 1, wherein said transponder circuit further comprises a radio frequency identification (RFID) integrated circuit.

8. The sticker transponder of claim 1, wherein said transponder circuit further includes a memory.

9. The sticker transponder of claim 8, wherein said memory further comprises a read-only portion and a re-writable portion.

10. A method for storing vehicle data, comprising the steps of:

affixing a sticker transponder to a glass surface of a vehicle, the sticker transponder comprising a flexible circuit substrate having a dipole antenna formed thereon and a transponder circuit disposed on the substrate and coupled to said antenna, said transponder circuit including a memory, said antenna having a characteristic impedance defined in part by a dielectric constant of said flexible circuit in combination with a dielectric constant of said glass surface, such that a proper impedance match between said antenna and said transponder circuit is achieved only when said sticker transponder is affixed to said glass surface; and storing vehicle data in said memory that is accessible to a reader disposed remotely from said vehicle.

11. The method of claim 10, wherein said memory further comprises a read-only portion, and said method further comprises the step of preprogramming said read-only portion with data that cannot be altered.

12. The method of claim 10, wherein said memory further comprises a re-writable portion, and said method further comprises the step of re-writing said stored vehicle data with current vehicle data.

13. The method of claim 12, wherein said vehicle data further comprises at least one of vehicle registration data, safety certification data, and emission control certification data, and said method further comprises the step of periodically updating said vehicle data to reflect current compliance status.

14. The method of claim 10, wherein said vehicle data further comprises toll collection data and said reader is provided in a toll collection station, and said method further comprises the step of decrementing said toll collection data each time said vehicle passes said toll collection station.

15. The method of claim 10, wherein said sticker transponder further comprises an indicia layer adapted to permit indicia to be printed thereon, and said affixing step further comprises affixing said sticker transponder so that said indicia is visible to users of said vehicle.

16. A sticker transponder, comprising:

a flexible circuit substrate having an antenna formed thereon and a transponder circuit disposed on the substrate and coupled to said antenna;

a spacer layer affixed to said flexible circuit substrate; and an adhesive layer coupled to an opposite side of said spacer layer from said flexible circuit substrate;

wherein, said antenna has a characteristic impedance defined in part by a dielectric constant of said flexible circuit substrate in combination with a dielectric constant of said spacer layer.

* * * * *